(12) United States Patent
Ferrara

(10) Patent No.: US 11,618,668 B2
(45) Date of Patent: Apr. 4, 2023

(54) SYSTEM AND METHOD FOR ON-DEMAND FUELING OF VEHICLES WITH AN ELECTRICALLY OPERATED MOBILE CART

(71) Applicant: Richard Ferrara, Naples, FL (US)

(72) Inventor: Richard Ferrara, Naples, FL (US)

(*) Notice: Subject to any disclaimer, the term of this patent is extended or adjusted under 35 U.S.C. 154(b) by 0 days.

(21) Appl. No.: 17/710,350

(22) Filed: Mar. 31, 2022

(65) Prior Publication Data
US 2022/0315409 A1    Oct. 6, 2022

Related U.S. Application Data

(60) Provisional application No. 63/168,464, filed on Mar. 31, 2021.

(51) Int. Cl.
  *B67D 7/84*   (2010.01)
  *B62B 3/10*   (2006.01)
  *B67D 7/78*   (2010.01)
  *B67D 7/04*   (2010.01)
  *B62B 5/00*   (2006.01)

(52) U.S. Cl.
  CPC ............. *B67D 7/845* (2013.01); *B62B 3/104* (2013.01); *B62B 5/0033* (2013.01); *B67D 7/04* (2013.01); *B67D 7/78* (2013.01)

(58) Field of Classification Search
  CPC .... B67D 7/04; B67D 7/845; B67D 2007/043; B62B 5/0033
  See application file for complete search history.

(56) References Cited

U.S. PATENT DOCUMENTS

| | | | |
|---|---|---|---|
| 4,911,330 A | | 3/1990 | Vlaanderen et al. |
| 5,667,113 A | * | 9/1997 | Clarke ................ B67D 7/845 |
| | | | 222/530 |
| 6,755,225 B1 | | 6/2004 | Niedwiecki |
| 6,786,245 B1 | | 9/2004 | Eichelberger |
| 7,108,026 B2 | | 9/2006 | Luca |
| 8,118,318 B1 | | 2/2012 | Chauza |
| 8,245,889 B1 | | 8/2012 | Starns |
| 8,276,692 B1 | * | 10/2012 | Nwaeke .................... B62B 5/06 |
| | | | 180/19.1 |

(Continued)

FOREIGN PATENT DOCUMENTS

| | | | | |
|---|---|---|---|---|
| DE | 102014113941 A1 | * | 3/2015 | ............... B67D 7/02 |
| DE | 102015120029 A1 | * | 7/2016 | ............... B67D 7/04 |

*Primary Examiner* — Timothy L Maust
(74) *Attorney, Agent, or Firm* — Mark Terry

(57) ABSTRACT

A system, apparatus and method for on-demand fueling of vehicles with a mobile, motorized handcart including a cart body coupled with a fuel tank, a plurality of wheels operatively connected to the cart body, the wheels operable with a motorized traction system, a steering handle operatively connected to the cart body and including controls for controlling the motorized traction system, a coupling system for securely coupling the cart body to the fuel tank, a hose and a nozzle, a spill guard surrounding the nozzle, an electric pump for pumping fuel from the fuel tank to the customer vehicle via the hose and nozzle, and a display dock disposed on the cart body, the display dock configured to dock a computing device configured to display fueling parameters based on a customer fuel request received via a communications network.

16 Claims, 12 Drawing Sheets

(56) References Cited

U.S. PATENT DOCUMENTS

| | | | | |
|---|---|---|---|---|
| 8,371,404 B2* | 2/2013 | Boeckler | ............... | E04H 4/14 |
| | | | | 180/65.1 |
| 9,434,598 B2 | 9/2016 | Pick et al. | | |
| 10,626,857 B1* | 4/2020 | Suntup | ............... | B67D 7/04 |
| 10,633,243 B2 | 4/2020 | Shock | | |
| 2012/0182156 A1* | 7/2012 | Portocalis | ............ | H04Q 9/00 |
| | | | | 340/870.02 |
| 2013/0168420 A1* | 7/2013 | Kern | ............... | B67D 7/845 |
| | | | | 222/401 |
| 2014/0129379 A1 | 5/2014 | Tryba | | |
| 2016/0039443 A1* | 2/2016 | Murakami | ............ | B62B 3/00 |
| | | | | 180/19.1 |
| 2016/0159267 A1 | 6/2016 | Dixon | | |
| 2017/0327369 A1* | 11/2017 | Mawdsley | ............ | B67D 7/84 |
| 2018/0334377 A1* | 11/2018 | Hart | ............... | B62B 3/104 |
| 2019/0119096 A1 | 4/2019 | Haile et al. | | |

* cited by examiner

SYSTEM AND METHOD FOR ON-DEMAND FUELING OF VEHICLES WITH AN ELECTRICALLY OPERATED MOBILE CART

CROSS REFERENCE TO RELATED APPLICATIONS

This application claims priority to provisional application 63/168,464 filed Mar. 31, 2021, entitled "system and method for on-demand fueling of vehicles with an electrically operated mobile cart." application 63/168,464 is incorporated by reference in its entirety.

STATEMENT REGARDING FEDERALLY SPONSORED RESEARCH DEVELOPMENT

Not applicable.

INCORPORATION BY REFERENCE OF MATERIAL SUBMITTED ON A COMPACT DISC

Not applicable.

TECHNICAL FIELD

The technical field relates generally to on-demand fueling of vehicles.

BACKGROUND

Typically, refueling a vehicle involves the driver exiting the vehicle and then interacting with some type of input device arranged at the fuel dispenser housing area in order to request the refueling operation and indicate the form of payment. The driver then proceeds to pump fuel into the vehicle for the predetermined amount. This exposes the driver to inclement weather and the safety risks posed by other moving vehicles in the refueling station and criminal activity in the gas station. In other versions of self-fueling, the driver utilizes a keypad to select the type of fuel, the volume of fuel to be dispensed, and any other related billing information.

It is known in the art that there exists a movable fuel dispenser adapted to be coupled to the fuel inlet of the vehicle, and programmable moving means connected to the fuel dispenser for moving the dispenser into a position where the nozzle can be coupled with the fuel inlet. However, such movable fueling mechanisms are not coordinated to arrive at a specific place and time. Nor are such fueling mechanisms have sufficient safety features to prevent spillage and fire hazards associated with fueling.

Therefore, a need exists for improvements over the prior art, and more particularly for more efficient methods and systems for automating the fueling of vehicles with a fueling cart/vehicle.

SUMMARY

A system, apparatus and method for on-demand fueling of vehicles with a mobile, motorized handcart including a cart body coupled with a fuel tank, a plurality of wheels operatively connected to the cart body, the wheels operable with a motorized traction system, a steering handle operatively connected to the cart body and including controls for controlling the motorized traction system, a coupling system for securely coupling the cart body to the fuel tank, a hose and a nozzle coupled to the handcart, the nozzle for insertion into a receptacle on a customer vehicle, a spill guard surrounding the nozzle, the spill guard comprising a flat plate that rests against the customer vehicle and an open container underneath the nozzle, the spill guard configured to reduce spillage of fuel, an electric pump for pumping fuel from the fuel tank to the customer vehicle via the hose and nozzle, and a display dock disposed on the cart body, the display dock configured to dock a computing device configured to display fueling parameters based on a customer fuel request received via a communications network.

In another embodiment, the handcart further comprises a processor communicatively connected to the pump, the display dock, and the computing device, whereby the processor regulates an amount of fuel pumped by the electric pump from the fuel tank to the customer vehicle, the amount of fuel corresponding to the customer fuel request received via the communications network.

A method for on-demand fueling of vehicles using a communications network includes transmitting, by a customer, a customer fuel request for fueling for a customer vehicle, the customer fuel request comprising a desired quantity of fuel and a location of the customer vehicle, wherein said customer fuel request is transmitted via the communications network, alerting, via the communications network, an operator about the customer fuel request comprising the desired quantity of fuel and the location of the customer vehicle, transporting, by the operator, a mobile, motorized handcart on a fuel transport vehicle to the customer vehicle at the location, the handcart comprising the handcart described above, loading, by the operator, the fuel tank to the handcart, whereby the fuel tank is in fluid communication with the electric pump, unloading, by the operator, the handcart from the fuel transport vehicle to the ground, coupling, by the operator, the hose to the receptacle on the customer vehicle, docking the computing device on the dock of the handcart, pumping, by the handcart, the desired quantity of fuel from the fuel tank into the customer vehicle, based on the customer fuel request, regulating, by the processor, an amount of fuel pumped by the electric pump from the fuel tank into the customer vehicle, corresponding to the customer fuel request, and loading, by the operator, the handcart on the fuel transport vehicle for subsequent fueling.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1:
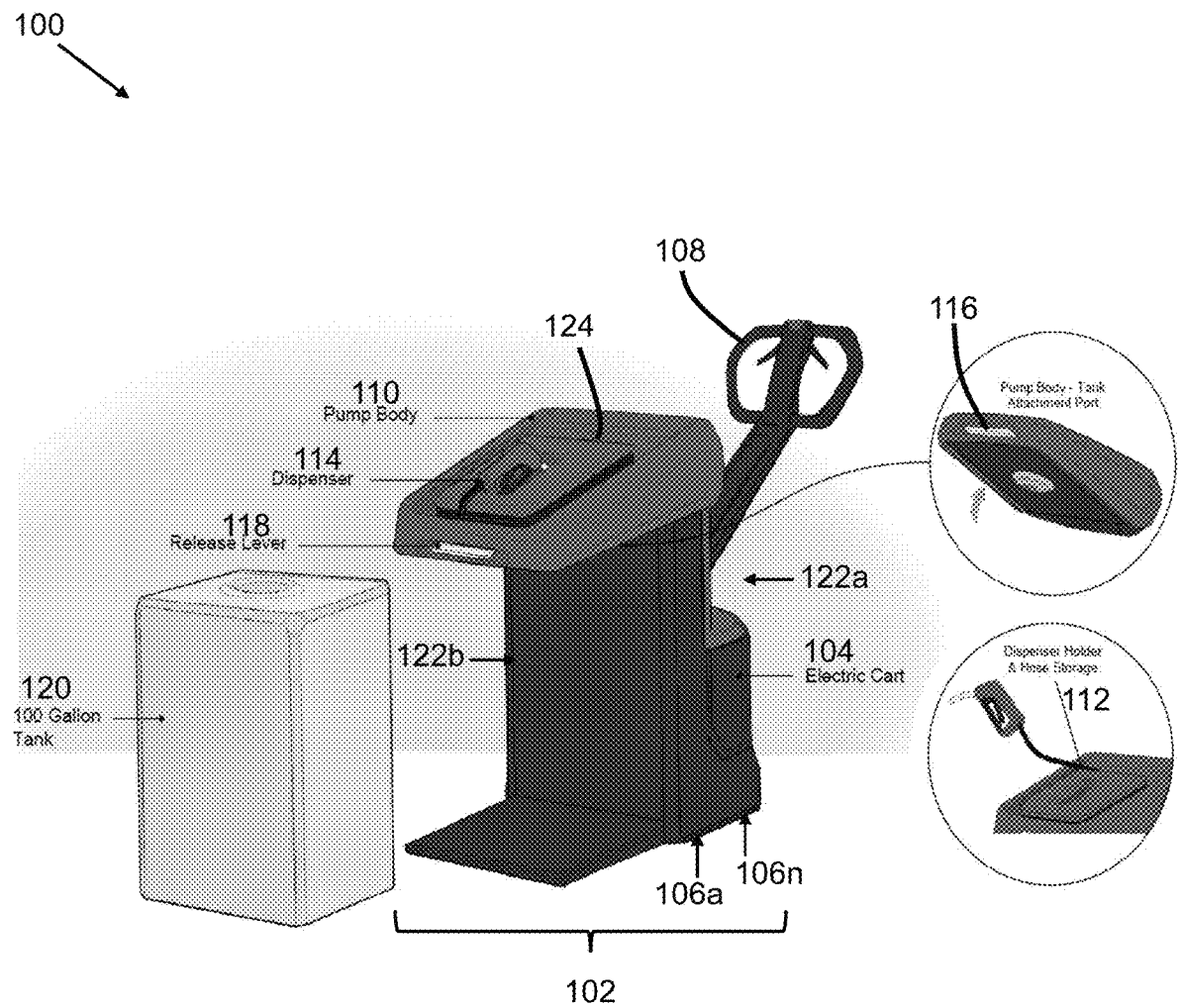
FIG. 1 is a perspective view of an exemplary system for on-demand fueling of vehicles with an electrically operated mobile cart, in accordance with an embodiment of the present disclosure.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing a quick and easy system and method for fueling a vehicle, on-demand. The claimed subject matter allows a customer to request fueling, including quantity of fuel and location of a customer vehicle, through a software application. An operator receives the request and transports a an electric-powered handcart on a fuel transport vehicle to begin the fueling process. Since an electric-powered handcart is used to perform the fueling, energy is conserved. Also, the use of retrofitted safety features on the customer vehicle and the handcart serve to prevent fuel spillage and fire hazards. The claimed subject matter also improves over the prior art by providing a more efficient, automated, and precise way of fueling vehicles. The fuel transport vehicle avoids weather exposure by keeping tanks and equipment dry and safe from the weather, ensures equipment is safe from pedestrians and protects against potential theft and other risks, and ensures safe transportation of fuel without concern of vapor containment by properly placing ventilation throughout the truck. the truck may also include a holding tank in the front of the truck cab which allows operators to empty low tanks with under 10 gallons to create a full tank for delivery at the end of a shift, or to consolidate for inventory or refueling at distribution stations.

Referring now to the figures, FIG. 1 is a mobile, motorized system 100 for on-demand fueling of vehicles with an electrically operated mobile cart. The system 100 comprises an electrically powered motorized handcart 102 that is small, versatile, and easy to maneuver. This can be useful characteristic when refueling customer vehicles in tight spaces, such as parking lots. Also, the use of electricity to power the handcart serves to reduce costs and makes the business of delivering fuel more profitable.

In one embodiment, the electrically powered motorized handcart 102 comprises a cart body 104, which is the structural foundation of the handcart 102. The cart body 104 is sized and dimensioned to enable an operator to perform a one-man operation of loading and unloading fuel tanks 120 and fueling of customer vehicles. The handcart 102 has a front side 122*a* from which the operator stands during operation. The front side 122*a* forms a space for the knees, and has steering handles 108 projecting therefrom, so that the handcart 102 can be maneuvered. This allows the operator to stand upright while maneuvering the handcart 102. A rear side 122*b* of the handcart 102 is configured primarily to receive (couple to), register, and unload a fuel tank 120. In one possible embodiment, the cart body 104 contains a rechargeable battery for receiving power in order to operate the pump, the dock, the processor, the traction system, etc.

Figure 2:
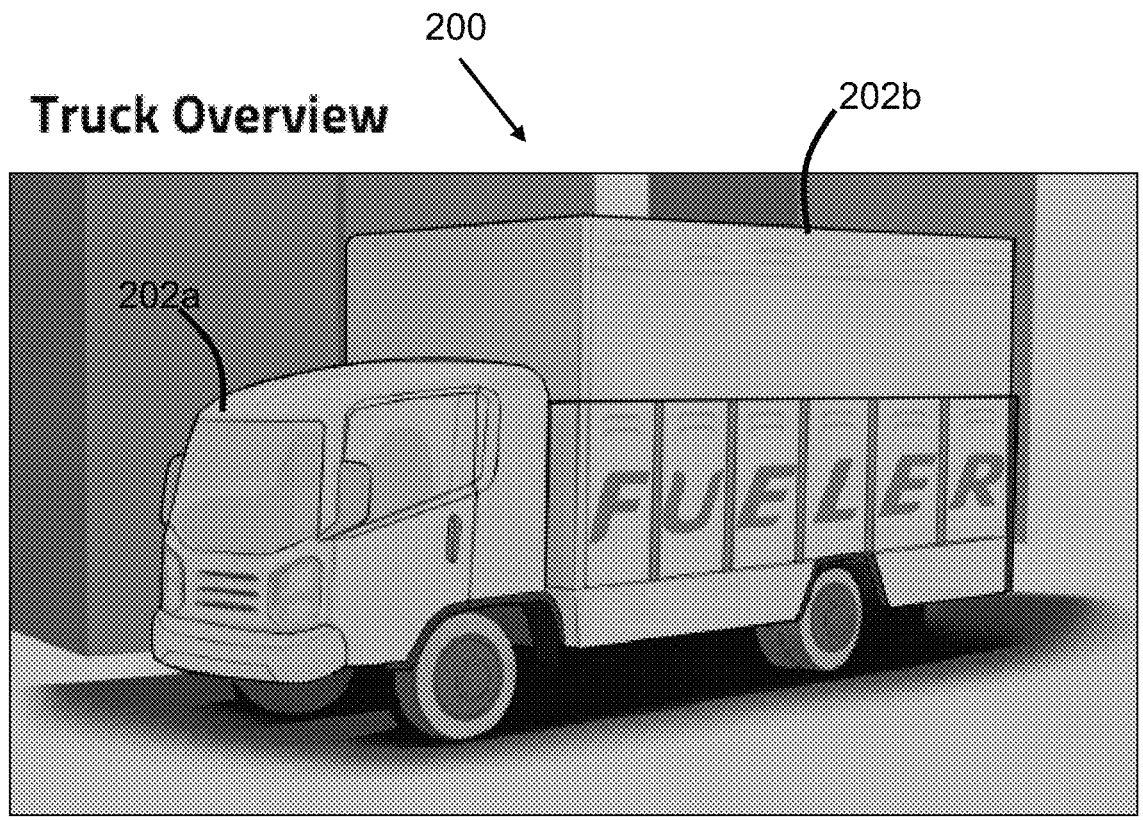
FIG. 2 is a perspective view of an exemplary fuel transport vehicle, in accordance with an embodiment of the present disclosure.
Figure 7:
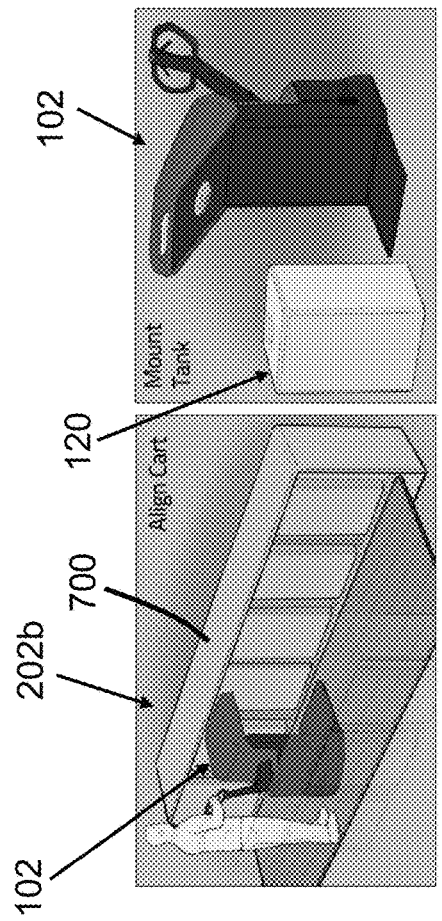
FIG. 7 is a perspective view of the operator aligning the handcart with a rack having a desired fuel tank, in accordance with an embodiment of the present disclosure.

Working in conjunction with the handcart 102, the claimed embodiments provide a fuel transport vehicle 200 that is configured to carry the handcart 102 and the fuel tanks 120 to a customer vehicle 900 for fueling thereof. FIG. 2 is a perspective view of an exemplary fuel transport vehicle 200. In some embodiments, the fuel transport vehicle 200 comprises a front cabin 202*a* from which the operator can control the vehicle, and a rear bed 202*b* with a rack 700 in the rear bed 202*b* that holds multiple fuel tanks 120 in a position to be loaded and unloaded by the handcart 102 (See FIG. 7). The truck may park in a designated safe zone and the operator may open the rear gate and enter the truck bed. During transport, the cart is locked with an internal brake and fastened to the floor with securing straps and the operator may release the securing straps to allow the cart to remove freely. The operator may position the handcart to align with a tank and push the cart under the tank to load the tank, then attach the pump hood to fully secure the cart to the tank. The operator may open the pump by pulling the release lever and pivoting the cover upward. Once the tank is positioned correctly, the operator may attach the tank by closing the pump cover onto the tank. A latch mechanism will engage the tank and lock it to the cart.

Figure 3:
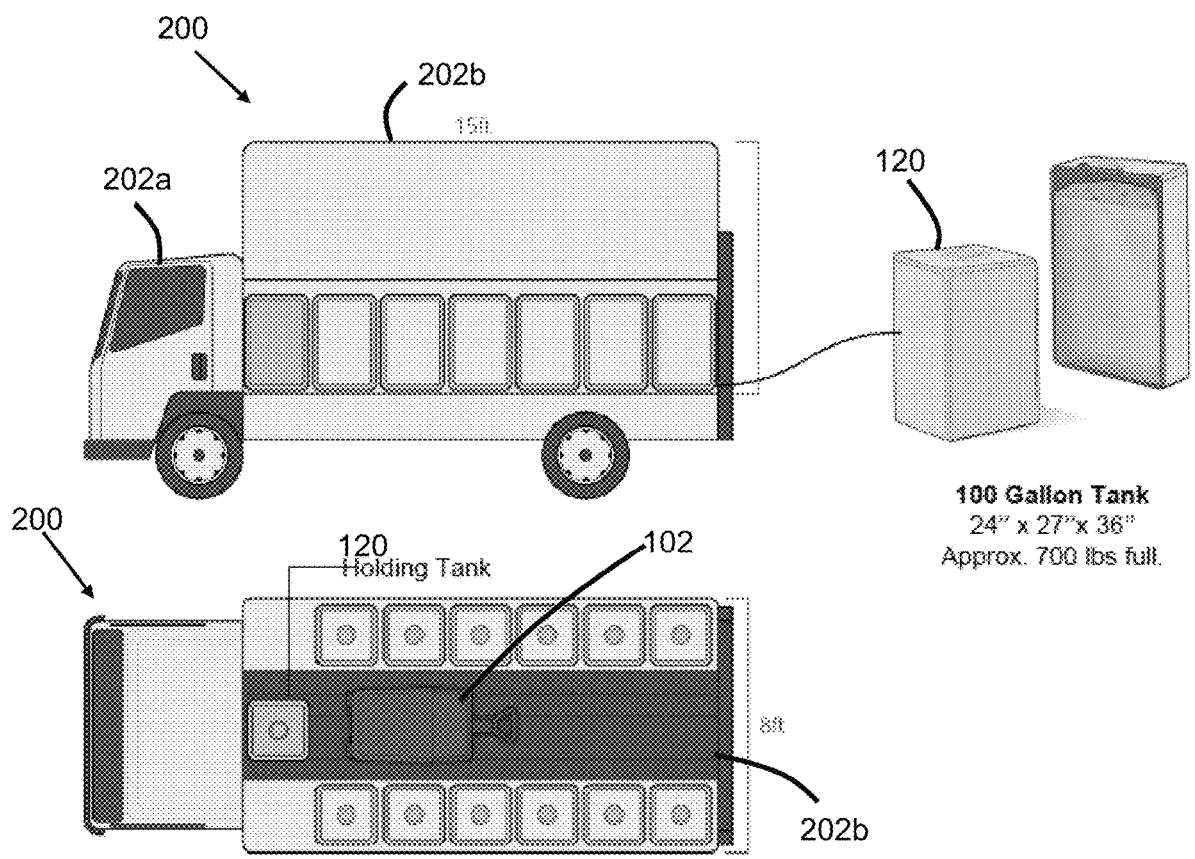
FIG. 3 is a sectioned view of an exemplary rear bed for the fuel transport vehicle containing fuel tanks, in accordance with an embodiment of the present disclosure.

For example, FIG. 3 is a sectioned view of an exemplary rear bed for the fuel transport vehicle containing fuel tanks. The fuel transport vehicle 200 has sufficient volume to carry multiple fuel tanks 120. In one possible embodiment, the fuel tanks 120 are 100-gallon gasoline tanks. However, the fuel transport vehicle 200 can be configured to carry any type of fuel and any size of fuel tank 120. The fuel transport vehicle 200 is also configured to securely carry the handcart 102 long distances for fueling the customer vehicles 900.

Figure 6:
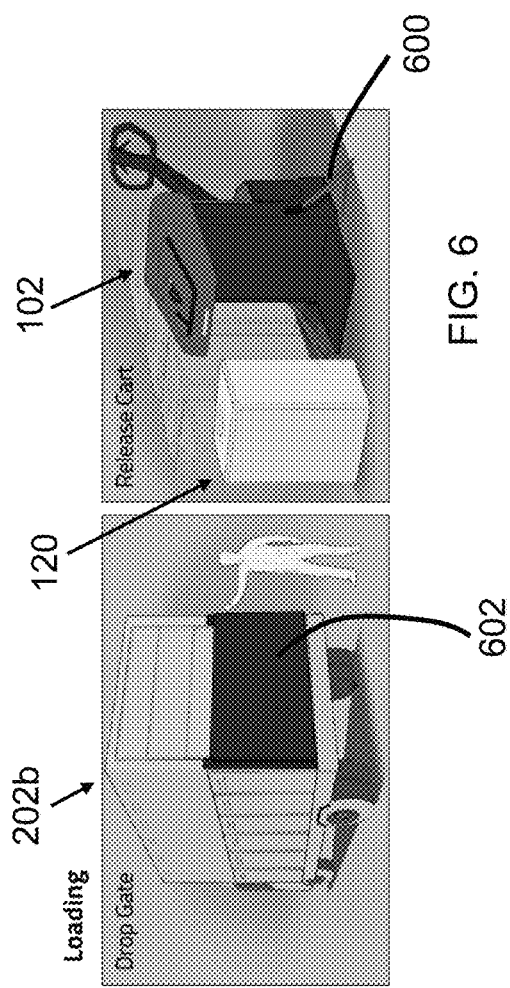
FIG. 6 is a perspective view of the operator loading a fuel tank onto the handcart, in accordance with an embodiment of the present disclosure.

Additionally, the fuel transport vehicle 200 carries the handcart 102. It is possible that the handcart 102 is retained in a special parking space inside the rear bed 202b of the fuel transport vehicle 200. In some embodiments, a securing strap 600 secures the handcart 102 in this parking space (see FIG. 6). The securing strap 600 is inside the rear bed 202b of the fuel transport vehicle 200 and configured to releasably fasten the handcart 102 in the fuel transport vehicle 200 until being unloaded for fueling operations. The securing strap 600 may be a fiber or artificial securing strap that is attached to a fastening point on the cart body, such as an eyelet, a rod, a U-bolt, a cleft or a cleat on the cart body.

Figure 8:
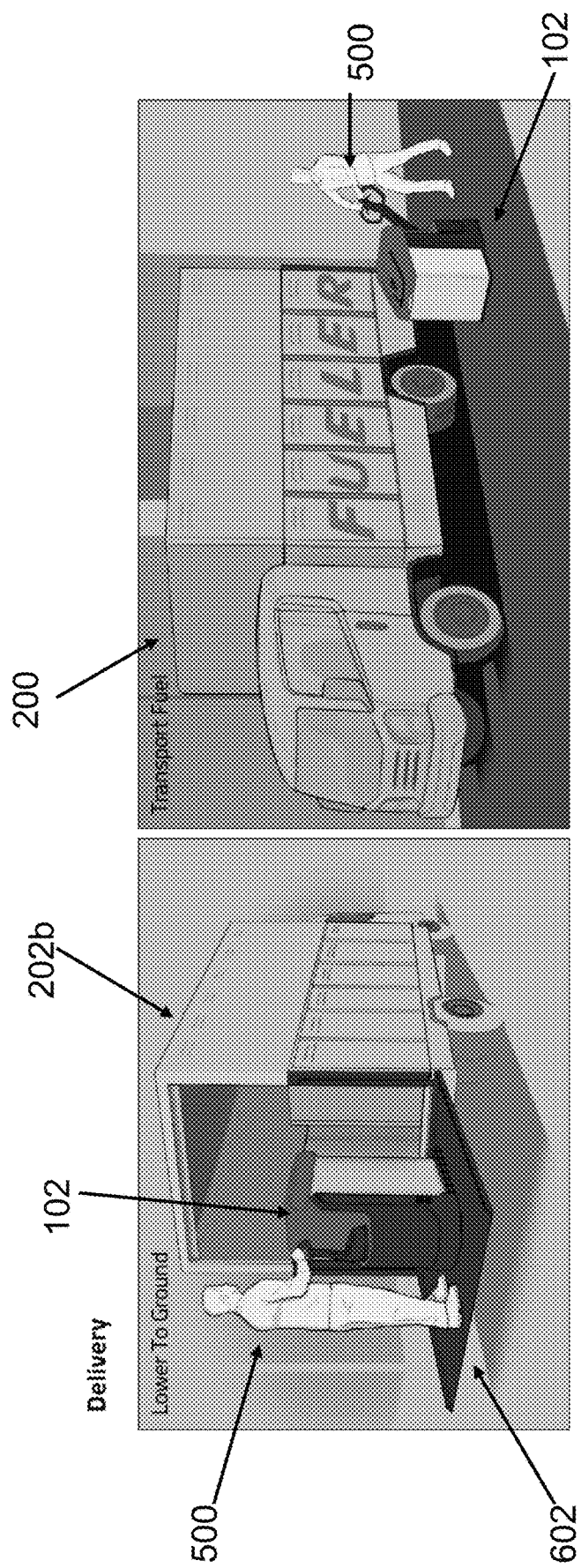
FIG. 8 is a perspective view of the operator unloading the handcart with a fuel tank from the fuel transport vehicle, in accordance with an embodiment of the present disclosure.

In one possible embodiment, the rear bed 202b of the fuel transport vehicle 200 comprises a loading ramp 602 that raises and lowers to enable loading and unloading of the handcart 102. For example, FIG. 8 shows the operator 500 unloading the handcart with a fuel tank from the fuel transport vehicle 200. Once unloaded, maneuvering of the handcart 102 is possible through a plurality of wheels 106a, 106n and steering handles 108 that are operatively connected to the cart body 104. Any number of wheels 106a, 106n may be used. In alternative embodiments, tracks or rollers may also be used. The wheels 106a, 106n are operable with a traction system. The steering handles 108 serve to control the traction system using user controls such as a steering wheel, handlebars, and buttons or levers that control the rate of rotation of the wheels, assistive steering, power steering, etc. In some embodiments, the handcart 102 comprises an internal brake that operatively connected to the wheels 106a, 106n. The internal brake is used for stopping, and in some embodiments, for generating power for the battery in the electrical handcart 102, i.e., regenerative braking. The user controls may also include a button or lever for engaging and disengaging the brake.

A motorized traction system is an electrically powered system that moves the wheels of the handcart according to user navigational controls (see steering handle and user controls). The system is powered by a power supply, such as a rechargeable battery, which provides power to an electric motor that rotates and moves said wheels. The user navigational controls can be used to command the system to rotate the wheels at a certain rate using a continuously variable transmission system. The user navigational controls can also be used to command the system to turn or steer the wheels to move the handcart in different directions.

As described above, the rear side 122b of the cart body 104 is configured to receive the fuel tank 120. Thus, the rear side has a coupling system for coupling to the fuel tank 120. This can include a port with a gasket, or a protruding to that mates with a corresponding tube or port in the fuel tank 120. The handcart 102 also has an electrically powered pump 110 that is configured for pumping fuel from the fuel tank 120 to the customer vehicle 900. As FIG. 1 illustrated, the pump 110 includes a hose 112 and a dispenser 114. The dispenser 114 can have a nozzle and control lever and be sized for insertion into a receptacle 1002 or fuel inlet on the customer vehicle 900. In some embodiments, the pump 110 may have an attachment port 116 for coupling to the fuel tank 120. The attachment port 116 easily and detachably couples to the fuel tank 120 and can have a quick release lever 118 to enable detachment therefrom, as a safety feature. The attachment port allows for fluid communication between the fuel in the tank, and the rest of the handcart.

Those skilled in the art will recognize that dispensing fuel, such as gasoline or diesel, can be a hazardous task. Such fuel is flammable and can irritate the skin. Thus, when operating in public spaces safety features must be utilized. Thus, the system 100 utilizes one or more safety dispensing mechanisms on or near the handcart 102 that facilitate, and make safer, the act of coupling the hose to the fuel tank 120. In this manner, the safety dispensing mechanisms are configured to help minimize spillage and fire hazards.

Figure 9:
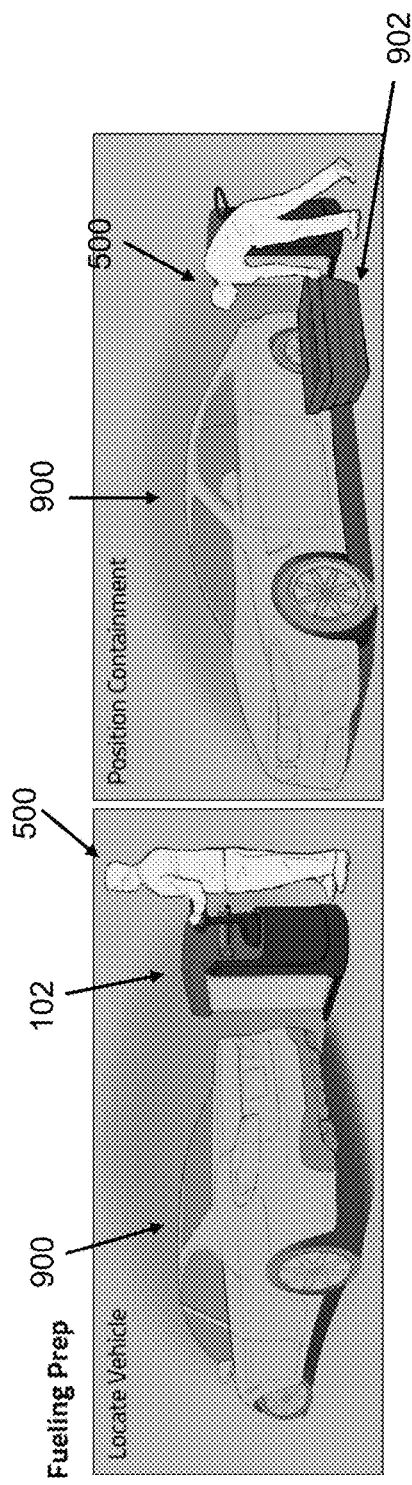
FIG. 9 is a perspective view of the operator preparing to fuel the customer vehicle by setting up the safety mechanism of a catch under the fuel receptacle, in accordance with an embodiment of the present disclosure.
Figure 10:
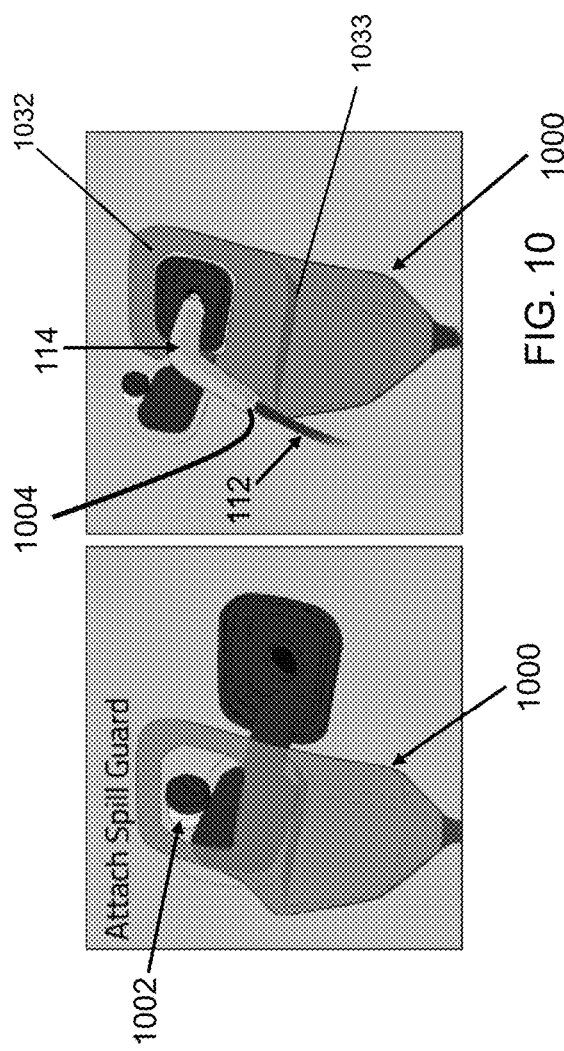
FIG. 10 is a perspective view of the spill guard fastened to the fuel receptacle of the customer vehicle, in accordance with an embodiment of the present disclosure.

In some embodiments, the safety dispensing mechanisms may include, without limitation, a dispenser spill guard 1000 that fits around the receptacle on the customer vehicle 900. The spill guard surrounds the nozzle, the spill guard comprising a flat plate 1302 that rests against the customer vehicle and an open container 1033 underneath the nozzle (for catching any fuel that has not entered the receptacle), the spill guard configured to reduce spillage of fuel. The flat plate include a rubber gasket type device (see FIG. 10). Another safety dispensing mechanism is a break-away connector 1004 that is disposed between the hose 112 and the dispenser 114. The break-away connector 1004 allows the hose to disengage from the customer vehicle 900 if excessive pressure or temperature is reached. Turning to FIG. 9, an additional safety dispensing mechanism is a secondary containment catch 902, such as a large bucket, that rests on the floor beneath the receptacle of the customer vehicle 900. The secondary containment catch 902 serves to catch any dripping fuel.

Figure 13:
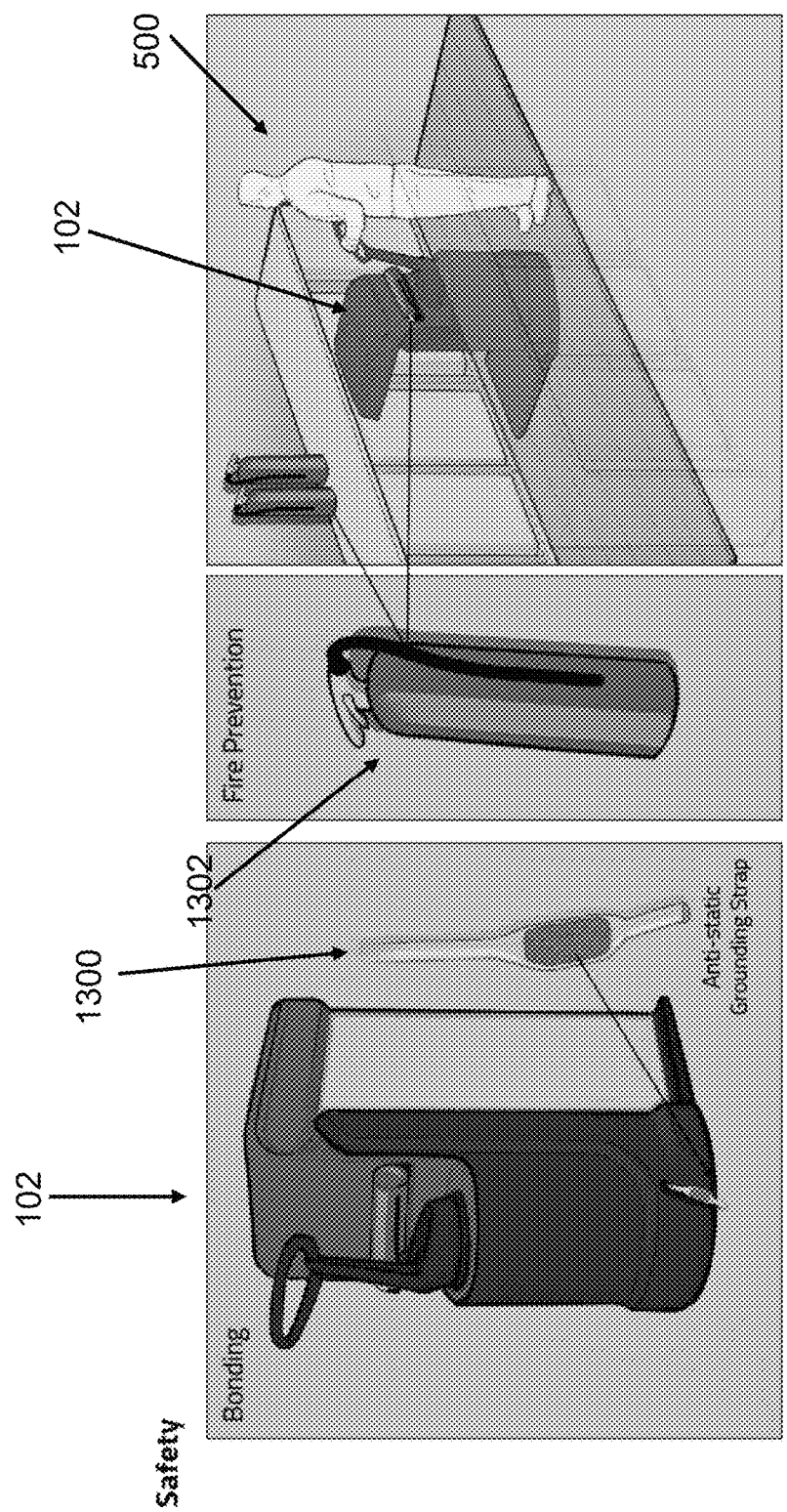
FIG. 13 is a perspective view of a static guar and a fire extinguisher being used in safety protocol, in accordance with an embodiment of the present disclosure.

Inside the fuel transport vehicle 200, and on the handcart 102 is a fire extinguisher 1302 that is classified for 3 classes of fires. Class A—fires from wood, cloth, paper, plastic, etc.; Class B—fires from flammable liquids like gasoline; and Class C—electrical fires from wiring and appliances. The fire extinguisher is easily accessible form the front end of the hand cart, or on the rack in the rear bed 202b of the fuel transport vehicle 200. An anti-static grounding strap 1300 is also used in the handcart 102 to help prevent sparks which can cause a fire. FIG. 13 is a perspective view of a static guard and a fire extinguisher being used in safety protocol. The anti-static grounding strap may be a fiber or artificial strap that is attached to a fastening point on the cart body, such as an eyelet, a rod, a U-bolt, a cleft or a cleat on the cart body.

Figure 5:
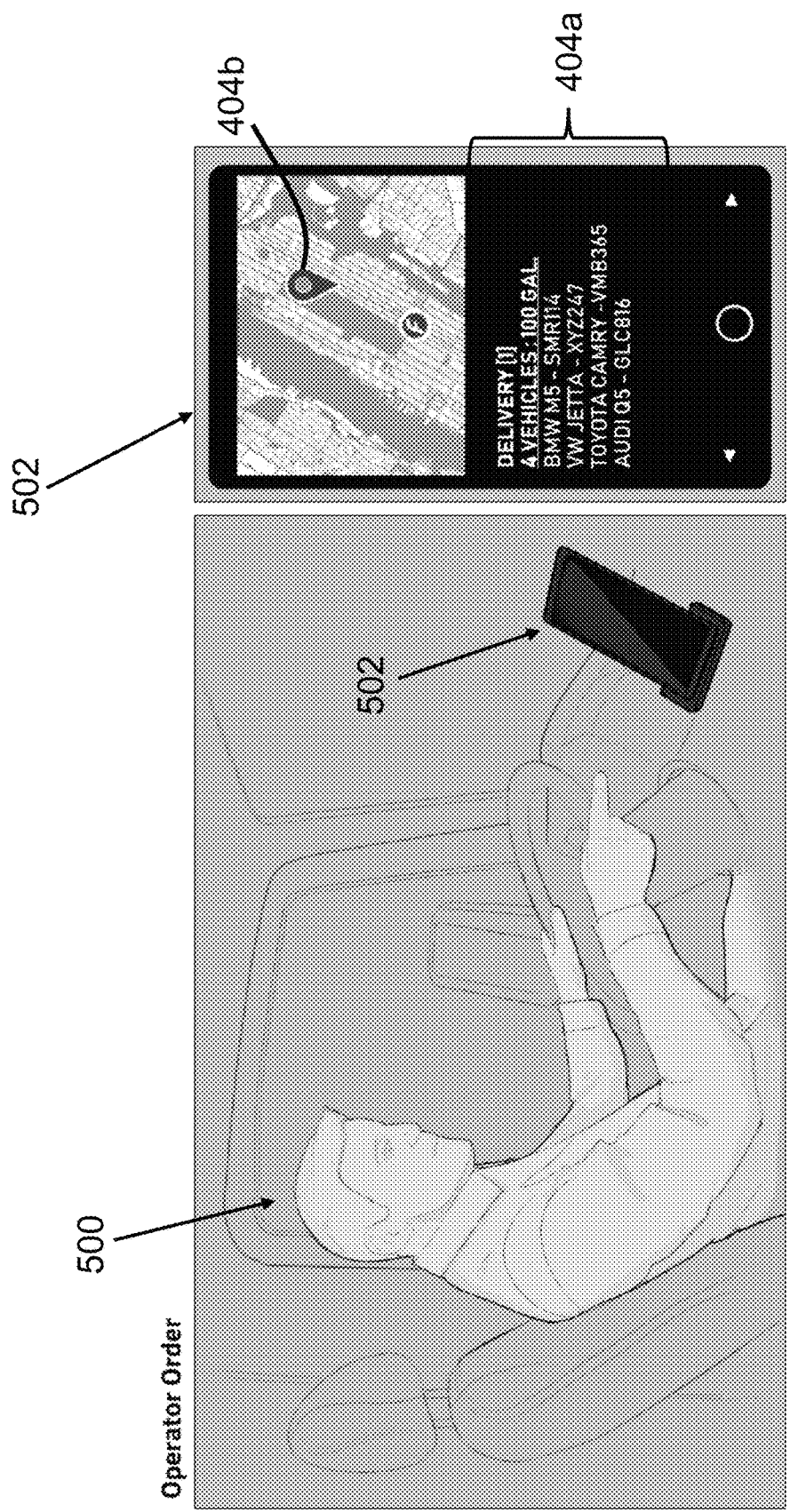
FIG. 5 is a perspective view of an exemplary operator responding to the fuel request from the customer, in accordance with an embodiment of the present disclosure.

In one possible embodiment, the handcart 102 comprises a display dock 124 that faces the operator while operating the handcart 102. The display dock 124 is configured to dock, or receive and electrically register, a communication device 502 (or a computing device such as a tablet computer, mobile phone or laptop) that is used by the operator 500. The communication device 502 is configured to display the required fueling parameters, based on a customer demand. FIG. 5 is a perspective view of an exemplary operator responding to the fuel request from the customer. The communication device 502 for the operator 500 may include, without limitation, a smart phone, a tablet, a laptop, a digital display screen, and a computer. Fueling parameters may include, without limitation, an amount of fuel the customer desires to be input into the customer vehicle (such as in liters or gallons), a fuel type, an identifier for the customer's vehicle, a VIN number for the customer's vehicle, a license plate number for the customer's vehicle, a make and model for the customer's vehicle, a location of the customer's vehicle, coordinates for the customer's vehicle, a map showing a location of the customer's vehicle, a desired delivery time, a fuel order number, an amount of fuel already input into the customer's vehicle, a remaining amount of fuel that is left to be input into the customer's vehicle, and the like.

Figure 4:
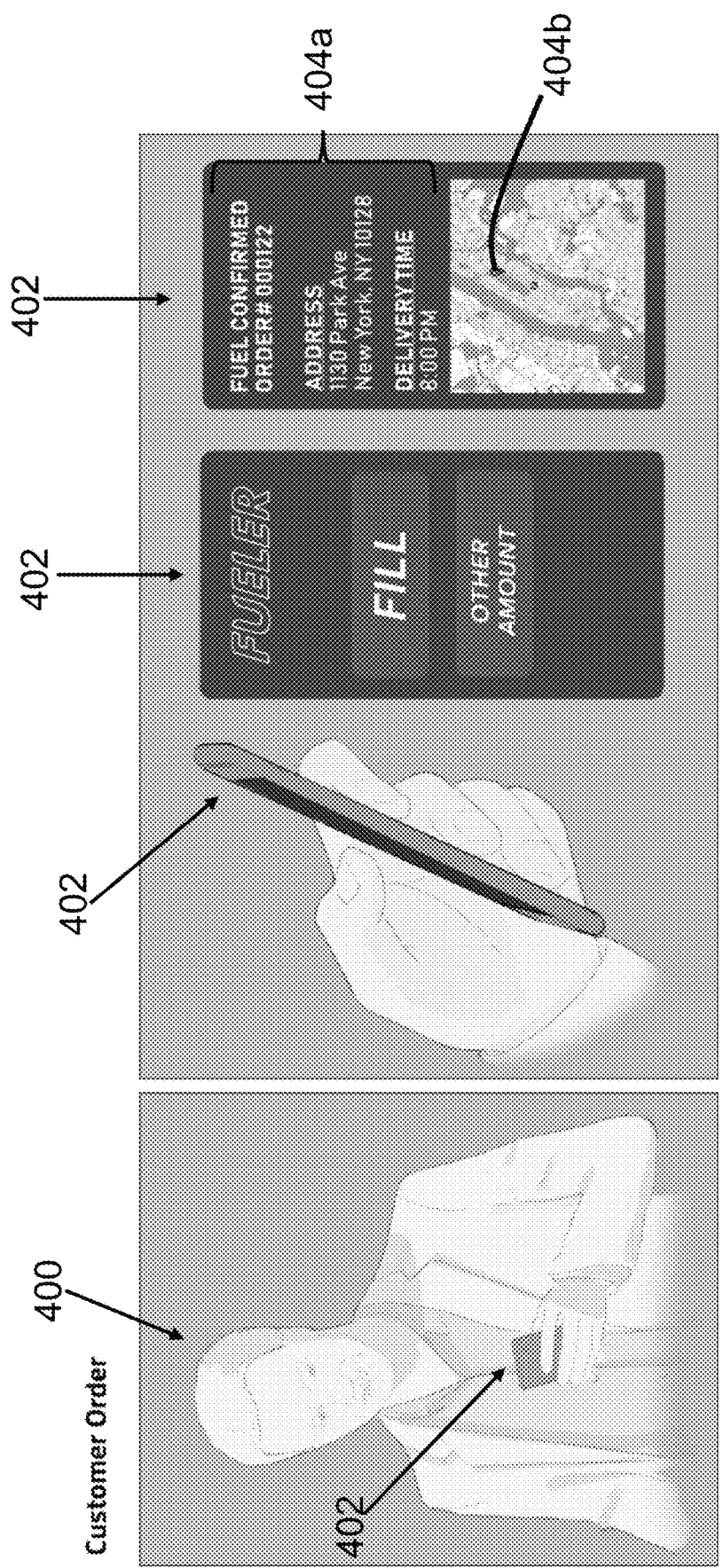
FIG. 4 is a perspective view of an exemplary customer requesting a fuel delivery through a communication device, in accordance with an embodiment of the present disclosure.

It is significant to note that customer also has communication device 402 (connected to a communications network, such as the cellular phone network, the Internet, the World Wide Web, etc.) that is used to request a fueling. For example, FIG. 4 is a perspective view of an exemplary customer requesting a fuel delivery through a communication device. The customer communication device 402 may be in communication with the aforementioned communication device of the operator, or a remote server or computer, which communicates and processes all requests and fueling operations. In some embodiments, various servers, networks, communication devices, and call centers can be used to coordinate the fueling process between the customer 400 and the operator 500. The communication device 402 for the customer 400 may include, without limitation, a smart phone, a tablet, a laptop, a digital display screen, and a computer. A customer fuel request may include a desired quantity of fuel, and a location of the customer vehicle, among other things, such as electronic payment information and any other data described herein related to fueling parameters.

In one exemplary fueling process, shown in FIGS. 4-14, a customer 400 accesses a software application on the customer communication device 402 to request a fuel quantity 404a to be delivered at a location 404b. For example, the customer 400 requests 20 gallons of fuel to be delivered to a blue Toyota Camry, license plate ABC-123, at the intersection of Main Street and First Street. Next, the communication device 502 alerts the operator 500 (via the communications network) that the request for fuel has been made, and displays the fuel quantity 404a to be delivered, and the location 404b of the customer vehicle 900. Customers may open an app on a mobile device or a personal computer to place and view orders. Orders can be processed by selecting one of the fill options provided and customers will then receive an order confirmation through the application. Order updates will occur through notifications within the application, such as fuel delivered and fuel are truck tracking.

Figure 11:
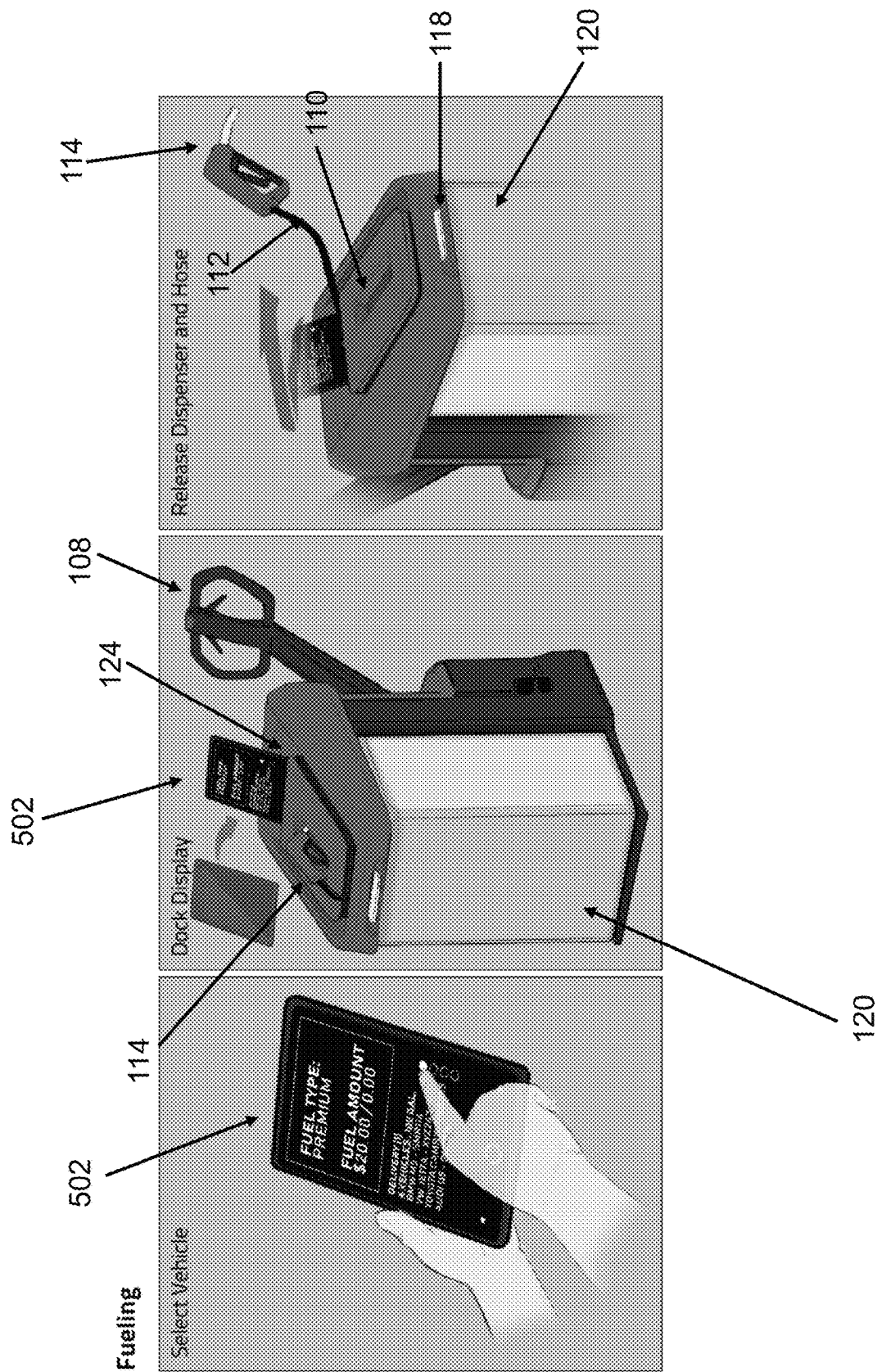
FIG. 11 is a perspective view of the operator commanding the pump to commence pumping fuel, in accordance with an embodiment of the present disclosure.

The operator 500 then proceeds in the fuel transport vehicle 200 (containing the handcart) to the location. The operator loads the appropriate fuel tank 120 into the handcart 102, and as shown in FIG. 8, unloads the handcart 102 from the ramp 602 of the fuel transport vehicle 200. Continuing with the fueling process, the operator maneuvers the handcart 102 to the fueling receptacle of the customer vehicle 900 and proceeds to fuel. FIG. 11 shows the operator 500 commanding the pump to commence pumping fuel into the customer vehicle 900. Operators can open an application on a supplied mobile device or tablet, and the operators will be shown a mapped route of scheduled deliveries, which will be planned along the fastest route for all destinations during that shift. Operators will be shown, on the application, a list of all vehicles at each delivery location, and the vehicles plate numbers. The pump may have an integrated auto shutoff feature at a predefined number of gallons, such as 25 gallons, to ensure safe fueling. Once the computing device is docked onto the dock, the computing device will display links to the pump electronics to dispense exact amount of fuel into the vehicle.

Figure 12:
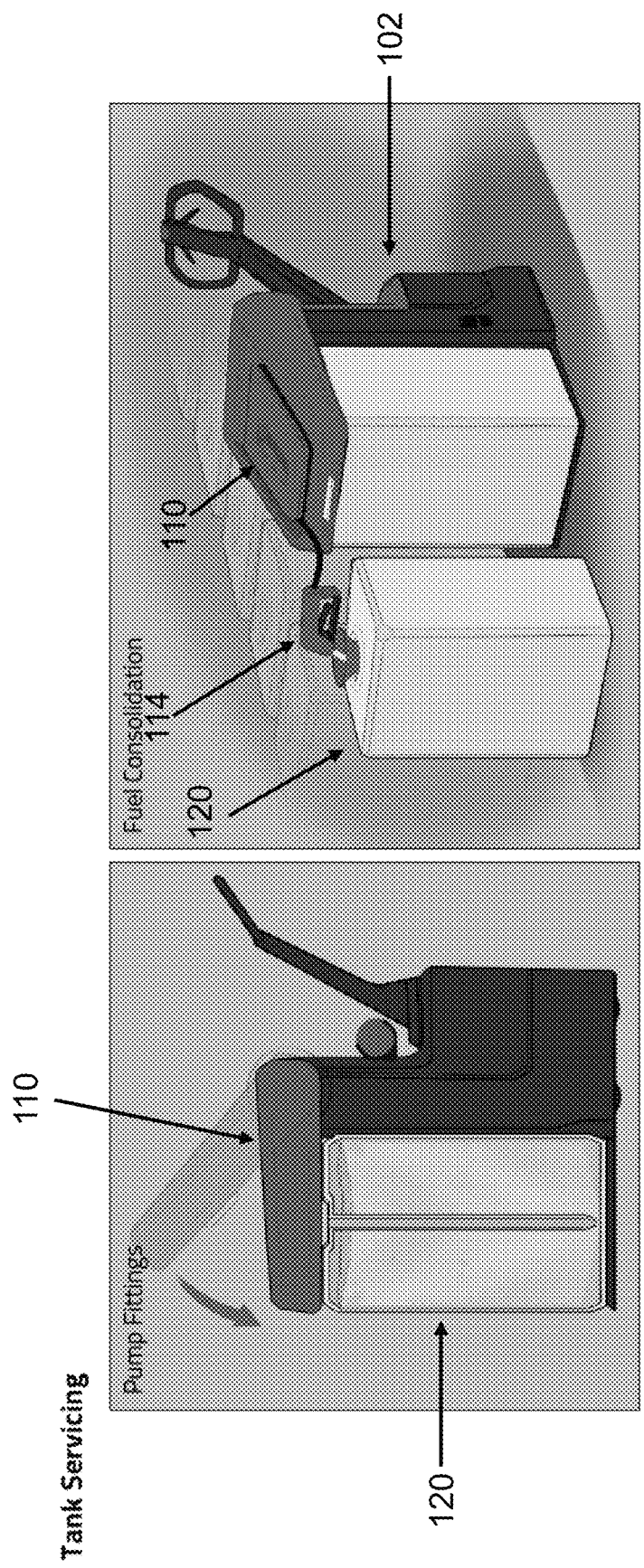
FIG. 12 is a perspective view of the operator consolidating unused fuel from the fuel tank, in accordance with an embodiment of the present disclosure.

In one embodiment, the handcart 102 comprises a processor that is operatively connected to the display dock and the pump 110, as well as the device coupled to the dock. The processor regulates the amount of fuel pumped from the fuel tank 120 to the customer vehicle by the pump, corresponding to the amount of fuel displayed on the communication device. Continuing with the example, the processor regulates a pump 110 in the handcart 102 to pump 20 gallons, and then charge the customer accordingly the price for twenty gallons. After finishing the fueling, the operator loads the handcart 102 onto the vehicle transport vehicle 200 and proceeds to the next fueling request. As shown in FIG. 12, the unused portion of fuel in the fuel tank 120 can be consolidated in a consolidation tank for future use and inventory control. The pump body utilizes a Cam mechanism to pivot and latch, securely locking onto the tank. The pump hood mounts via a male fitting which corresponds to the recess in the tank. Gaskets between both parts ensure an airtight seal between tank and pump fitting. Operators will empty remaining fuel into a holding tank on board the truck.

Figure 14:
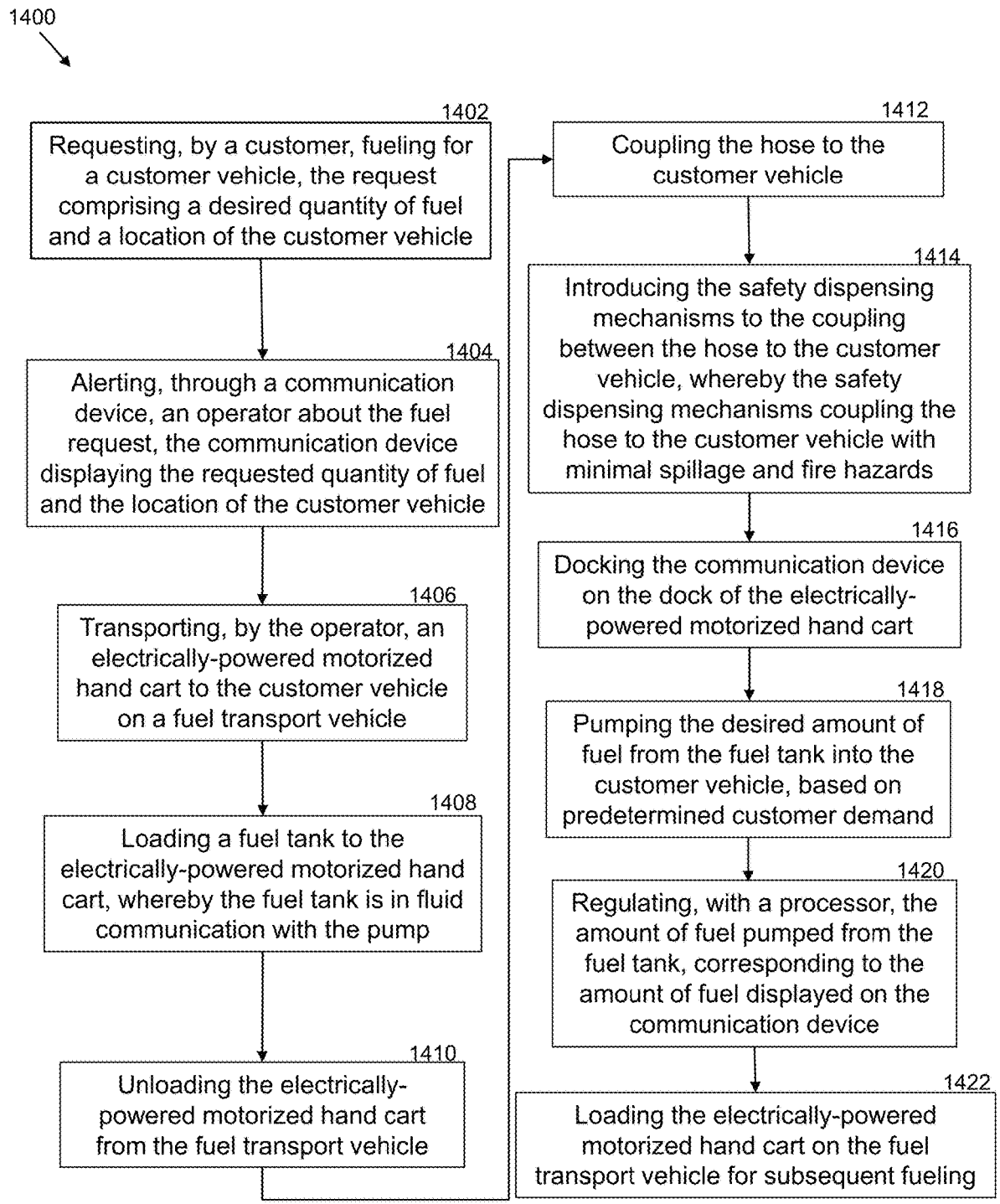
FIG. 14 is a flowchart of a method for on-demand fueling with an electrically operated mobile cart, in accordance with an embodiment of the present disclosure.

FIG. 14 references a flowchart of a method 1400 for on-demand fueling with an electrically operated mobile cart. The method 1400 includes an initial step 1402 of requesting, by a customer, fueling for a customer vehicle, the request comprising a desired quantity of fuel and a location of the customer vehicle.

Another step 1404 comprises alerting, through a communication device, an operator about the fuel request, the communication device displaying the requested quantity of fuel and the location of the customer vehicle.

In some embodiments, the method 1400 includes a step 1406 of transporting, by the operator, an electrically powered motorized handcart to the customer vehicle on a fuel transport vehicle, the electrically powered motorized handcart comprising wheels, a pump including a hose and a dispenser, a coupling system for coupling to a fuel tank on the fuel transport vehicle, a dock for docking the communication device, and one or more safety dispensing mechanisms.

Another step 1408 includes loading a fuel tank to the electrically powered motorized handcart, whereby the fuel tank is in fluid communication with the pump.

Another step 1410 comprises unloading the electrically powered motorized handcart from the fuel transport vehicle.

Yet another step 1412 includes coupling the hose to the customer vehicle.

Yet another step 1414 comprises introducing the safety dispensing mechanisms to the coupling between the hose to the customer vehicle, whereby the safety dispensing mechanisms help in coupling the hose to the customer vehicle with minimal spillage and fire hazards.

Another step 1416 includes docking the communication device on the dock of the electrically powered motorized handcart.

Another step 1418 includes pumping the desired amount of fuel from the fuel tank into the customer vehicle, based on predetermined customer demand.

In some embodiments, the method 1400 includes a step 1420 of regulating, with a processor, the amount of fuel pumped from the fuel tank, corresponding to the amount of fuel displayed on the communication device.

A final step 1422 comprises loading the electrically powered motorized handcart on the fuel transport vehicle for subsequent fueling.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general-purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A mobile, motorized handcart for on-demand fueling of vehicles, the handcart comprising:
    a cart body coupled with a fuel tank;
    a plurality of wheels operatively connected to the cart body, the wheels operable with a motorized traction system;
    a steering handle operatively connected to the cart body and including controls for controlling the motorized traction system;
    a coupling system for securely coupling the cart body to the fuel tank;
    a hose and a nozzle coupled to the handcart, the nozzle for insertion into a receptacle on a customer vehicle;
    a spill guard surrounding the nozzle, the spill guard comprising a flat plate that rests against the customer vehicle and an open container underneath the nozzle, the spill guard configured to reduce spillage of fuel;
    an electric pump for pumping fuel from the fuel tank to the customer vehicle via the hose and nozzle; and
    a display dock disposed on the cart body, the display dock configured to dock a computing device configured to display fueling parameters based on a customer fuel request received via a communications network.

2. The handcart of claim 1, further comprising an internal brake operatively connected to the wheels, the internal brake configured to lock movement of the plurality of wheels and restrict movement of the handcart.

3. The handcart of claim 2, further comprising a securing strap and a fastening point on the cart body, the securing strap and fastening point configured to releasably fasten the handcart to a fuel transport vehicle.

4. The handcart of claim 3, further comprising an anti-static grounding strap and a fastening point on the cart body, the anti-static grounding strap and fastening point configured to release static from the handcart to ground.

5. The handcart of claim 4, further comprising a breakaway connector disposed between the hose and the dispenser.

6. The handcart of claim 5, further comprising a processor communicatively connected to the pump, the display dock, and the computing device, whereby the processor regulates an amount of fuel pumped by the electric pump from the fuel tank to the customer vehicle, corresponding to the customer fuel request received via the communications network.

7. The handcart of claim 6, wherein the electric pump comprises an attachment port for coupling to the fuel tank.

8. The handcart of claim 7, wherein the cart body contains a rechargeable battery for powering the motorized traction system, the electric pump, and the processor.

9. A mobile, motorized handcart for on-demand fueling of vehicles, the handcart comprising:
    a cart body coupled with a fuel tank;
    a plurality of wheels operatively connected to the cart body, the wheels operable with a motorized traction system;
    a steering handle operatively connected to the cart body and including controls for controlling the motorized traction system;
    a coupling system for securely coupling the cart body to the fuel tank;
    a hose and a nozzle coupled to the handcart, the nozzle for insertion into a receptacle on a customer vehicle;
    a spill guard surrounding the nozzle, the spill guard comprising a flat plate that rests against the customer vehicle and an open container underneath the nozzle, the spill guard configured to reduce spillage of fuel;
    an electric pump for pumping fuel from the fuel tank to the customer vehicle via the hose and nozzle;
    a display dock disposed on the cart body, the display dock configured to dock a computing device configured to display fueling parameters based on a customer fuel request received via a communications network; and
    a processor communicatively connected to the pump, the display dock, and the computing device, whereby the processor regulates an amount of fuel pumped by the electric pump from the fuel tank to the customer vehicle, the amount of fuel corresponding to the customer fuel request received via the communications network.

10. The handcart of claim 9, further comprising an internal brake operatively connected to the wheels, the internal brake configured to lock movement of the plurality of wheels and restrict movement of the handcart.

11. The handcart of claim 10, further comprising a securing strap and a fastening point on the cart body, the securing strap and fastening point configured to releasably fasten the handcart to a fuel transport vehicle.

12. The handcart of claim 11, further comprising an anti-static grounding strap and a fastening point on the cart body, the anti-static grounding strap and fastening point configured to release from the handcart to ground.

13. The handcart of claim 12, further comprising a breakaway connector disposed between the hose and the dispenser.

14. The handcart of claim 13, wherein the electric pump comprises an attachment port for coupling to the fuel tank.

15. The handcart of claim 14, wherein the cart body contains a rechargeable battery for powering the motorized traction system, the electric pump, and the processor.

16. A method for on-demand fueling of vehicles using a communications network, the method comprising:

transmitting, by a customer, a customer fuel request for fueling for a customer vehicle, the customer fuel request comprising a desired quantity of fuel and a location of the customer vehicle, wherein said customer fuel request is transmitted via the communications network;

alerting, via the communications network, an operator about the customer fuel request comprising the desired quantity of fuel and the location of the customer vehicle;

transporting, by the operator, a mobile, motorized handcart on a fuel transport vehicle to the customer vehicle at the location, the handcart comprising:
a) a cart body coupled with a fuel tank;
b) a plurality of wheels operatively connected to the cart body, the wheels operable with a motorized traction system;
c) a steering handle operatively connected to the cart body and including controls for controlling the motorized traction system;
d) a coupling system for securely coupling the cart body to the fuel tank;
e) a hose and a nozzle coupled to the handcart, the nozzle for insertion into a receptacle on the customer vehicle;
f) a spill guard surrounding the nozzle, the spill guard comprising a flat plate that rests against the customer vehicle and an open container underneath the nozzle, the spill guard configured to reduce spillage of fuel;
g) an electric pump for pumping fuel from the fuel tank to the customer vehicle via the hose and nozzle;
h) a display dock disposed on the cart body, the display dock configured to dock a computing device configured to display fueling parameters based on the customer fuel request received via the communications network; and
i) a processor communicatively connected to the pump, the display dock, and the computing device, whereby the processor regulates an amount of fuel pumped by the electric pump from the fuel tank to the customer vehicle, the amount of fuel corresponding to the customer fuel request received via the communications network;

loading, by the operator, the fuel tank to the handcart, whereby the fuel tank is in fluid communication with the electric pump;

unloading, by the operator, the handcart from the fuel transport vehicle to the ground;

coupling, by the operator, the hose to the receptacle on the customer vehicle;

docking the computing device on the dock of the handcart;

pumping, by the handcart, the desired quantity of fuel from the fuel tank into the customer vehicle, based on the customer fuel request;

regulating, by the processor, an amount of fuel pumped by the electric pump from the fuel tank into the customer vehicle, corresponding to the customer fuel request; and loading, by the operator, the handcart on the fuel transport vehicle for subsequent fueling.

* * * * *